US009290360B2

(12) United States Patent
Takeyama et al.

(10) Patent No.: US 9,290,360 B2
(45) Date of Patent: Mar. 22, 2016

(54) ENDLESS ESCALATOR HANDRAIL AND ESCALATOR

(71) Applicant: MITSUBISHI ELECTRIC CORPORATION, Chiyoda-ku, Tokyo (JP)

(72) Inventors: Hidetoshi Takeyama, Tokyo (JP); Tomoko Hada, Tokyo (JP); Atsushi Kawasaki, Tokyo (JP); Yoshitomo Nishimura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/760,004

(22) PCT Filed: Apr. 7, 2014

(86) PCT No.: PCT/JP2014/060088
§ 371 (c)(1),
(2) Date: Jul. 9, 2015

(87) PCT Pub. No.: WO2014/175051
PCT Pub. Date: Oct. 30, 2014

(65) Prior Publication Data
US 2015/0336774 A1    Nov. 26, 2015

(30) Foreign Application Priority Data

Apr. 24, 2013 (JP) .................................. 2013-090913

(51) Int. Cl.
*B66B 23/24* (2006.01)
*B66B 23/06* (2006.01)
(Continued)

(52) U.S. Cl.
CPC .................. *B66B 23/24* (2013.01); *B66B 21/02* (2013.01); *B66B 23/06* (2013.01); *F16G 3/10* (2013.01)

(58) Field of Classification Search
CPC ........ B66B 21/02; B66B 23/06; B66B 23/24; F16G 3/10
USPC ........................................ 198/337, 338, 844.2
See application file for complete search history.

(56) References Cited

U.S. PATENT DOCUMENTS 4,776,446 A * 10/1988 Fisher ..................... B66B 23/24
198/337
5,773,114 A * 6/1998 Adams ..................... F16G 3/10
198/844.2
(Continued)

FOREIGN PATENT DOCUMENTS

JP          2-261942 A     10/1990
JP       2004-224504 A      8/2004
(Continued)

OTHER PUBLICATIONS

International Search Report (PCT/ISA/210) mailed on Jun. 17, 2014, by the Japanese Patent Office as the International Searching Authority for International Application No. PCT/JP2014/060088.

*Primary Examiner* — Mark A Deuble
(74) *Attorney, Agent, or Firm* — Buchanan Ingersoll & Rooney PC

(57) ABSTRACT

The endless escalator handrail is made up of a thermoplastic resin member having a first and a second curved portions and a joint section; a flat woven fabric bonded to an inner surface of the thermoplastic resin member; a first patch cloth having a base portion and a divergent portion, for being placed on the first curved portion side in the joint section; and a second patch cloth having a base portion and a divergent portion, for being placed on the second curved portion side in the joint section. The divergent potion of the first patch cloth is bonded onto the flat woven fabric at an inward side of the first curved portion, and the divergent potion of the second patch cloth is bonded onto the flat woven fabric at an inward side of the second curved portion.

7 Claims, 6 Drawing Sheets

(51) Int. Cl.
  *B66B 21/02*  (2006.01)
  *F16G 3/10*  (2006.01)

(56) References Cited

U.S. PATENT DOCUMENTS 6,761,259 B1    7/2004  Onodera et al.
7,083,037 B2 *  8/2006  Durrer .............. B29C 65/5042
                                                      198/335
7,562,759 B2 *  7/2009  Guo ...................... B66B 23/04
                                                      198/335
2009/0127067 A1 * 5/2009  Guo ...................... B66B 23/24
                                                      198/337
2010/0181164 A1  7/2010  Kawasaki et al.

FOREIGN PATENT DOCUMENTS

JP          2006-117329 A      5/2006
WO      WO 2009/001456 A1     12/2008
WO      WO 2014/027393 A1      2/2014

* cited by examiner

ENDLESS ESCALATOR HANDRAIL AND ESCALATOR

TECHNICAL FIELD

The present invention relates to an endless handrail of an escalator, and more particularly to the shape of a patch cloth used for the joint section of the endless handrail.

BACKGROUND ART

The endless handrail of the escalator is manufactured from a belt-like product preformed in whole by extrusion molding. The belt-like product is cut into a length according to a customer's spec and then joined in a loop. Thus, the endless handrail has a joint section. The endless handrail is made up of a composite material (canvas, thermoplastic resin, etc.). The cut ends of the endless handrail are joined by remelting the thermoplastic resin member. In order to ensure strength of the joint section of the endless handrail and to protect the joined edges on the back side of the endless handrail, a patch cloth is ordinarily bonded to the canvas surface in the joint section.

If a rectangular patch cloth is bonded to the back side of the endless handrail so as to cover an entire canvas surface of the joint section, the stiffness of the joint section of the handrail becomes extremely higher compared to that of the base body portion of the handrail. Since a local stiffness change thereby occurs at a bonding interface of the patch cloth, stress concentrates locally at the bonding interface of the patch cloth when the endless handrail is bent. As a result, separation of the patch cloth occurs in the joint section of the handrail, and a crack and breakage begin to grow in the handrail itself from the separation point.

There are disclosed many contrivances that target extending the life of the joint section of an endless handrail. Among them, an endless belt has been known that has a belt structure in which both ends of the belt base member are butt-joined. Both ends of the belt base member are cut diagonally with respect to the longitudinal direction of the belt. These diagonal ends are characterized in that they have rounded acute angle edges (for example, Patent Document 1).

PRIOR ART DOCUMENT

Patent Document

Patent Document 1: JP H02-261942 A

SUMMARY OF THE INVENTION

Problem that the Invention is to Solve

As described above, an endless handrail of an escalator is manufactured from a belt-like product preformed in whole by extrusion molding. The endless handrail has a joint section for joining in a loop the cut belt-like product. The cut ends of the endless handrail are joined by remelting the thermoplastic resin member. The joined edges are bare at the canvas surface on the back side of the handrail. For the purpose of reinforcing connection of the canvas and protecting the joined edges of the canvas surface, a patch cloth is bonded so as to cover the joint section. If a rectangular patch cloth is bonded to the back side of the endless handrail so as to cover the entire canvas surface of the joint section, the stiffness of the joint section of the endless handrail becomes extremely higher compared to that of the base body portion of the endless handrail.

If a local stiffness change is produced at the bonding interface of the patch cloth, stress locally concentrates there when the endless handrail is bent. As a result, the stress concentrates at the bonding interface of the patch cloth in the joint section by positive and negative bending occurring when the endless handrail passes during operation through the driving section and through the round section where the handrail is turned from an ascending direction to a descending direction. Repetition of the bending causes separation of the patch cloth and leads to the beginning of crack and breakage growth in the handrail itself from the separation point. The present invention aims at providing a technology of preventing separation in the joint section of a butt-joined endless handrail.

Means for Solving the Problem

An endless escalator-handrail according to the present invention includes a thermoplastic resin member having a first and a second curved portions formed oppositely on both lateral sides of a flat portion of the member, and joined at a joint section by melting cut ends of the member; a flat woven fabric bonded to an inner surface of the thermoplastic resin member to cover the flat portion and the first and the second curved portions; a first patch cloth having a base portion and a divergent portion, for being placed on a first curved portion side in the joint section; and a second patch cloth having a base portion and a divergent portion, for being placed on a second curved portion side in the joint section, wherein the divergent potion of the first patch cloth is bonded onto the flat woven fabric at an inward side of the first curved portion, and the divergent potion of the second patch cloth is bonded onto the flat woven fabric at an inward side of the second curved portion.

Advantages of the Invention

According to the present invention, increase in stiffness of the joint section of an endless handrail can be more suppressed compared to that of the flat portion of the handrail. As a result, the patch cloth can be prevented from separation, thus bringing about an effect of extending the life of the joint section of the endless handrail.

EMBODIMENTS FOR CARRYING OUT THE INVENTION

Hereinafter, Embodiments for an escalator and an endless handrail thereof according to the present invention are described in detail with reference to the drawings. It should be noted that the present invention is not limited to the description below but may be modified appropriately without departing from the spirit of the invention.

Embodiment 1

Figure 1:
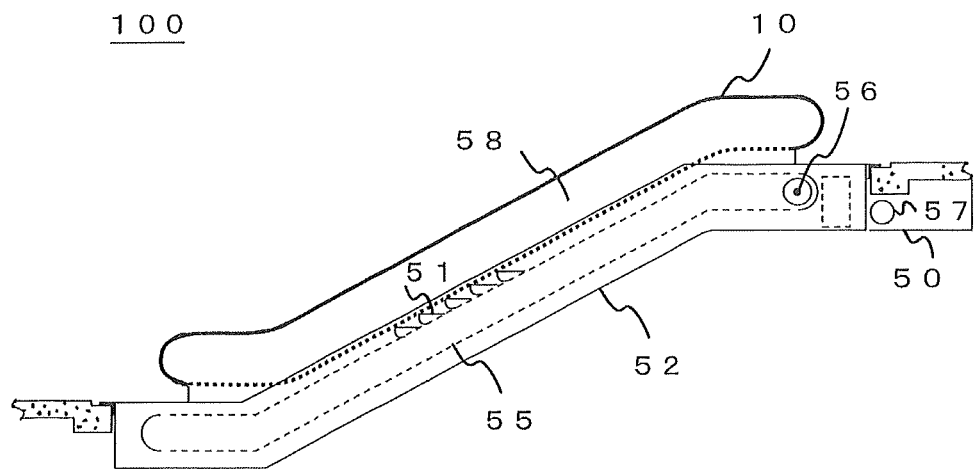
FIG. 1 is a view showing an overall configuration of an escalator according to embodiments of the present invention.

FIG. 1 is a view showing an overall configuration of an escalator according to embodiments of the present invention. The escalator 100 includes an endless handrail 10, a machine room 50, steps 51, a main frame 52, a step driving chain 55, a main shaft 56, a drive machine 57, and panels 58. The main frame 52 is bridged between adjacent upper and lower floors and supports the weight of the escalator itself and passenger load. The plurality of connected steps 51 are continuously moved by the rotation of the main shaft 56. The drive machine 57 is installed in the machine room 50 of the escalator 100. The driving power of the drive machine 57 is transmitted to the main shaft 56 through a drive chain. The steps 51 are connected in a loop. The rotation of the main shaft 56 is transmitted to the steps 51 through the step driving chain 55. Passengers on the escalator 100 use the endless handrail 10 as an assist during ascending/descending. The panels 58 are provided for ensuring safety for passengers.

Figure 2:
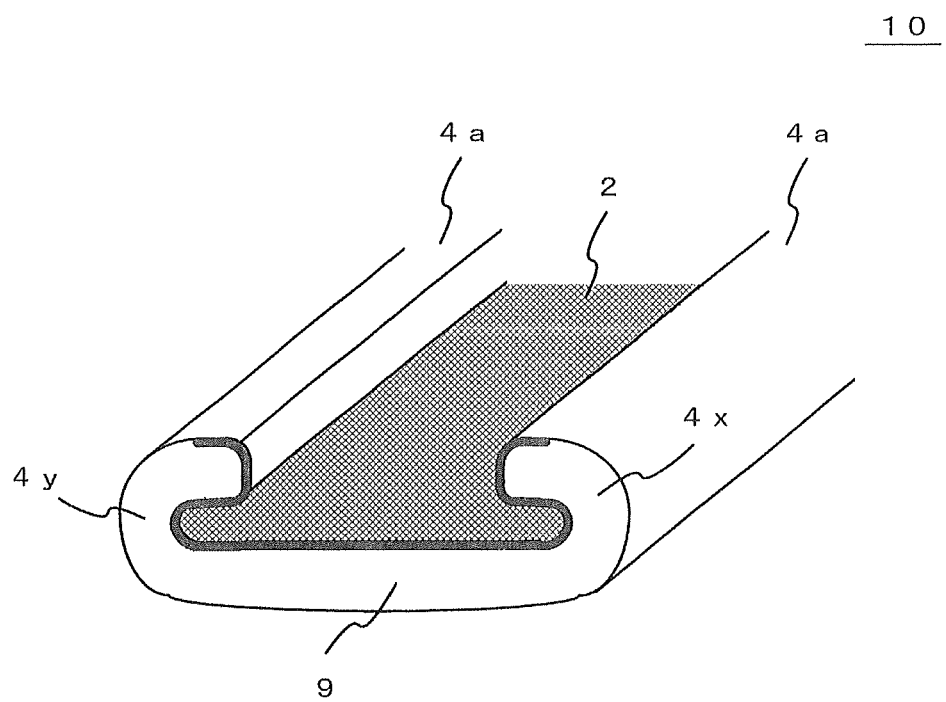
FIG. 2 is a cross sectional view showing a structure of an endless handrail according to the embodiments of the present invention.

FIG. 2 is a cross sectional view showing a shape of the endless handrail of the escalator. The endless handrail 10 is manufactured from a belt-like product preformed in a continuous line of some hundreds meters by extrusion molding. The belt-like product is cut in a length according to a customer's spec and then the cut product is joined in a loop. Seeing the cross sectional shape, the endless handrail 10 has an ear portion (a first curved portion) $4x$, an ear portion (a second curved portion) $4y$, and a base body portion (flat portion) 9. The ear portions $4x$ and $4y$ are formed on both lateral sides of the base body portion (flat portion) 9 and curved in an outwardly convex shape. The inner surface (back side) of a thermoplastic resin member 1 is covered entirely along the circumference with a canvas 2 that is a thick cloth flatly woven with cotton and hemp. The ear portions $4x$ and $4y$ are opposite to each other and each have an upper surface $4a$. The ear portion 4 is made up of the preformed thermoplastic resin member 1 and the canvas 2, and formed in accordance with the shape of the endless handrail.

Figure 3:
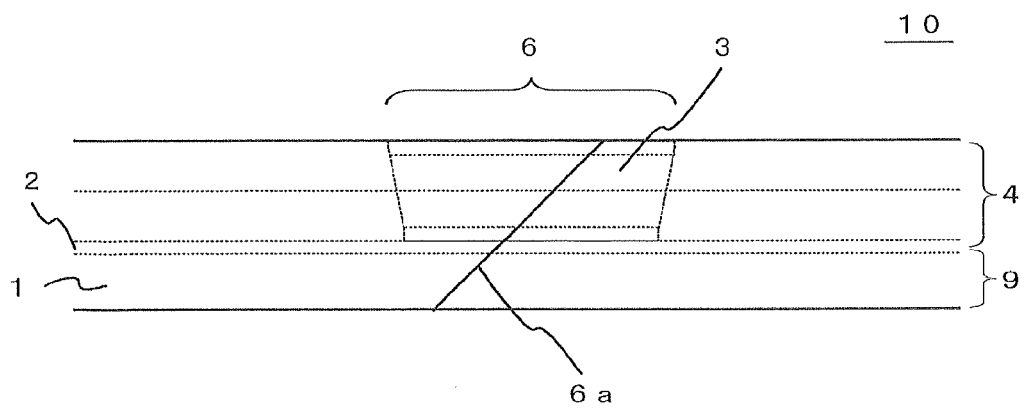
FIG. 3 is a side view showing a joint section of the endless handrail according to the embodiments of the present invention.

FIG. 3 is a side view showing the joint section of the endless handrail of the escalator. The joint section of the endless handrail 10 is made up of the thermoplastic resin member 1, the canvas 2, a patch cloth 3, etc. There is always one joint section 6 in the endless handrail 10. Since the endless handrail 10 is formed by butt-joining diagonal cut ends of the belt-like product, the patch cloth 3 is placed on an inward side of the ear portion 4 so as to cover the diagonal cut edges (joined edges) $6a$. The cut ends (joined edges) $6a$ are joined by remelting the thermoplastic resin member 1. In order to ensure strength of the joint section 6 and to protect the joined edges on the back side of the handrail, the patch cloth 3 is bonded to the canvas surface in the joint section 6 of the endless handrail 10.

Figure 4:
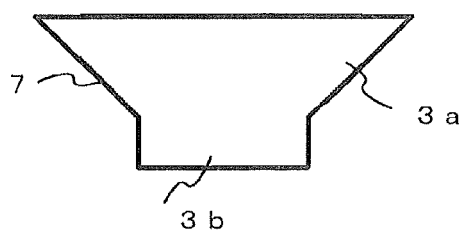
FIG. 4 is a developed view showing a shape of a patch cloth according to Embodiment 1 of the present invention.

FIG. 4 is a developed view showing a shape of the patch cloth according to Embodiment 1 of the present invention. The patch cloth 3 according to Embodiment 1 has a divergent portion $3a$ and a base portion $3b$. The divergent portion $3a$ has a shape diverging upwards (in the diverging direction) from the base portion $3b$. The base portion $3b$ is a trapezoidal shape. The patch cloth 3 is bonded to the canvas 2 in conformity to the contour of the endless handrail 10 from an outside of the ear portion 4 to the interior surface of the ear portion 4. An angled shaped portion 7 of the patch cloth, i.e., the divergent portion $3a$ is placed on the upper surface $4a$ and the round shaped interior surface of the ear portion 4 of the endless handrail in conformity to the contour thereof, to be bonded onto the canvas 2. The base portion $3b$ is placed so as to cover the base body portion (flat portion) 9, to be bonded onto the canvas 2. The base portion $3b$ may be placed on the round shaped interior surface of the ear portion 4 in conformity to the contour thereof.

Figure 5:
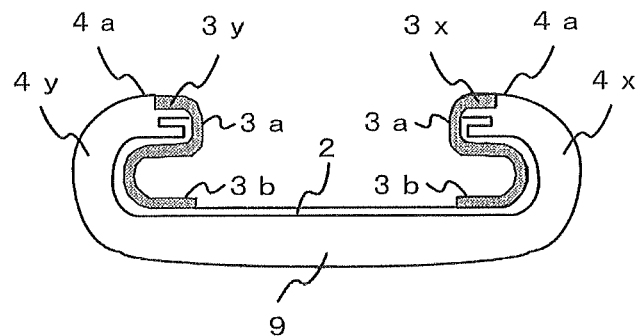
FIG. 5 is a cross sectional view showing a joint section of the endless handrail according to Embodiment 1 of the present invention.

FIG. 5 is a cross sectional view showing the joint section of the endless handrail. The ear portion 4 is made up of the preformed thermoplastic resin member 1 and the canvas 2, and formed in accordance with the shape of the endless handrail. The patch cloth 3 is bonded to the canvas 2 in conformity to the contour of the endless handrail from the outside of the ear portion 4 (upper surface $4a$) to the interior surface of the ear portion 4. The patch cloth 3 does not continuously cover the flat base body portion 9 of the endless handrail 10 but is bonded to each of the both-side ear portions $4x$ and $4y$. That is, a patch cloth $3x$ is bonded to the ear portion $4x$ in the joint section 6. Likewise, a patch cloth $3y$ is bonded to the ear portion $4y$ in the joint section 6.

Since stiffness of the both-side ear portions 4 is higher than that of the planar flat portion (base body portion 9) because of the structure of the endless handrail, the patch cloth 3 is bonded to each ear portion 4 of the handrail 10. When the endless handrail passes through the driving section and through the round section where the handrail is turned from an ascending direction to a descending direction, positive and negative bending of the endless handrail produces a stress therein. Distribution of the stress is such that a higher stress is produced in the both-side ear portions 4 than in the base body portion (flat portion) 9. This is the reason why the patch cloth is not continuously bonded up to the flat base body portion of the endless handrail. Bonding the patch cloths 3 separately to the both-side ear portions $4x$ and $4y$ can ensure strength of the joint section of the endless handrail.

Figure 6:
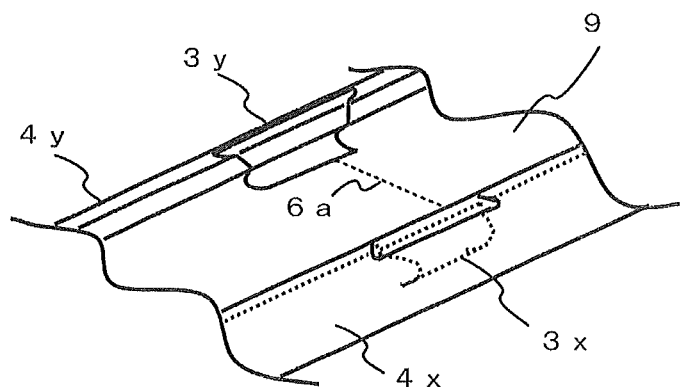
FIG. 6 is an oblique perspective view showing the joint section of the endless handrail according to Embodiment 1 of the present invention.
Figure 7:
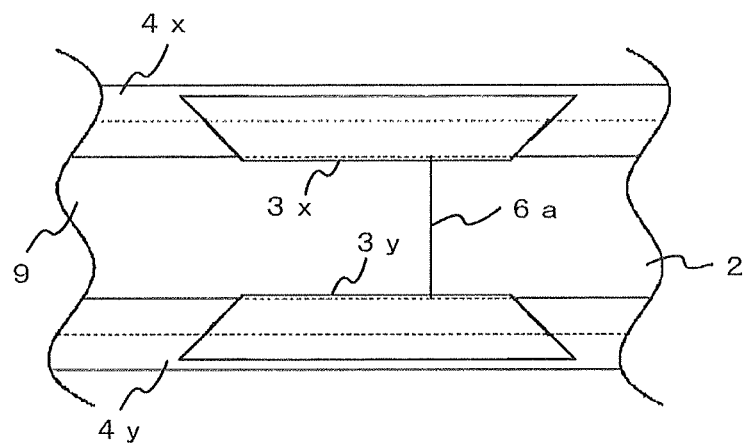
FIG. 7 is a top view showing the joint section of the endless handrail according to Embodiment 1 of the present invention.

FIG. 6 is an oblique perspective view showing the joint section of the endless handrail, and FIG. 7 is a top view showing the joint section of the endless handrail. The place for the patch cloth 3 to be bonded is an area that covers the joined edges of the joint section 6 in the ear portion 4 of the endless handrail butt-joined at the base body portion 9 thereof. The patch cloth's angled shaped portion 7 is placed on and bonded to the upper surface $4a$ and the round shaped interior surface of the ear portion 4 of the endless handrail in conformity to the contour thereof. In order to suppress the patch cloth 3 to a minimum size, the cut edges $6a$ are offset from the middle of the joint section 6.

As described above, in the joint section 6 of the endless handrail, the patch cloth 3, in contact with the upper surface $4a$ and the round shaped interior portion of the ear portion 4, is formed in shape to be the angled shaped portion 7. Accordingly, seeing the longitudinal cross section of the endless handrail, the area of the patch cloth 3 bonded to the canvas 2 gradually changes in the longitudinal direction. Thus, stiffness of the endless handrail can also be changed gradually in the longitudinal direction without a steep change starting from the bonding interface of the patch cloth in a cross section.

By bonding the patch cloth separately to each of the both-side ear portions 4, the area of the patch cloth 3 bonded to the joint section 6 of the endless handrail can be more reduced, compared to a case of bonding so as to cover the entire butt-joined edges in the joint section 6 of the endless handrail. Accordingly, increase in stiffness of the joint section 6 of the endless handrail can be more suppressed compared to that of the base body portion 9, and the stress in the patch cloth produced at the bonding interface thereof can also be suppressed. As a result, an effect is brought about that extends the life of the joint section 6 of the endless handrail.

There is a correlation between stiffness of the endless handrail and stress produced when the endless handrail is bent. Gradual variation in stiffness of the endless handrail in the longitudinal direction thereof also changes gradually the stress produced in the patch cloth 3 at the bonding interface thereof by the positive and negative bending occurring when the endless handrail passes during operation through the driving section and through the round section where the handrail is turned from the ascending direction to the descending direction. Since the stress produced in the patch cloth is distributed by gradually changing the stress produced in the patch cloth 3 at the bonding interface thereof in the joint section 6 of the endless handrail, a peak value of the produced stress is reduced and local stress concentration can be suppressed. As a result, separation of the patch cloth 3 can be suppressed, thus bringing about an effect of extending the life of the joint section 6 of the endless handrail.

Embodiment 2

Figure 8:
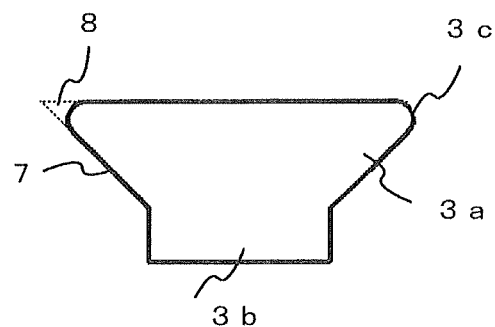
FIG. 8 is a developed view showing a shape of a patch cloth according to Embodiment 2 of the present invention.
Figure 9:
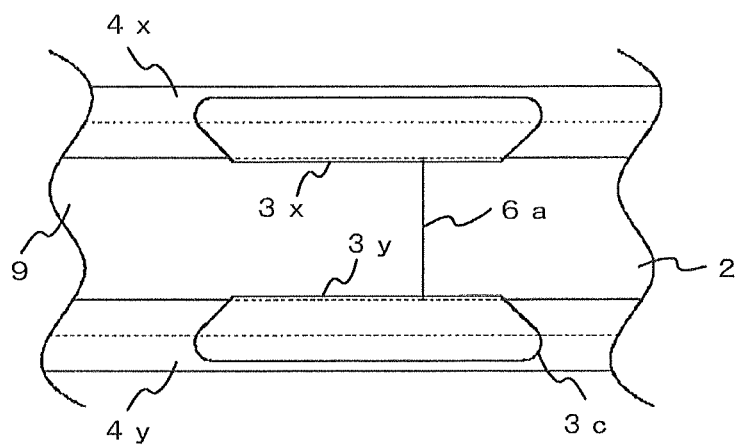
FIG. 9 is a top view showing a joint section of the endless handrail according to Embodiment 2 of the present invention.

FIG. 8 is a developed view showing a shape of a patch cloth according to Embodiment 2 of the present invention, and FIG. 9 is a top view showing the joint section of the endless handrail. The patch cloth 3 according to Embodiment 2 is formed to have a round shaped chamfer 3c on an acute angle corner 8 of an angled shaped portion 7. The round shaped chamfer 3c is positioned at the upper surface 4a of the ear portion 4. The patch cloth's angled shaped portion 7, i.e., the divergent portion 3a is placed on and bonded to the upper surface and the round shaped interior surface of the ear portion 4 of the endless handrail in conformity to the contour thereof. The base portion 3b is placed on and bonded to the base body portion (flat portion) 9 so as to cover it.

Making the round shaped chamfer on the acute angle corner 8 allows for mitigating local stress concentration produced at the acute angle portion by the positive and negative bending occurring when the endless handrail passes during operation through the driving section and through the round section where the handrail is turned from the ascending direction to the descending direction. If the acute angle corner 8 is sharp, the corner tip has almost no bonded area. In a case of making no round shaped chamfer on the acute angle corner 8, separation of the patch cloth may often begin to occur from the acute angle point because it has a small bonded area. Making the round shaped chamfer on the acute angle corner 8 allows for increasing the bonded area of the acute angle corner 8, thus suppressing separation of the patch cloth. As a result, an effect is brought about that extends the life of the joint section 6 of the endless handrail, as with Embodiment 1.

Embodiment 3

Figure 10:
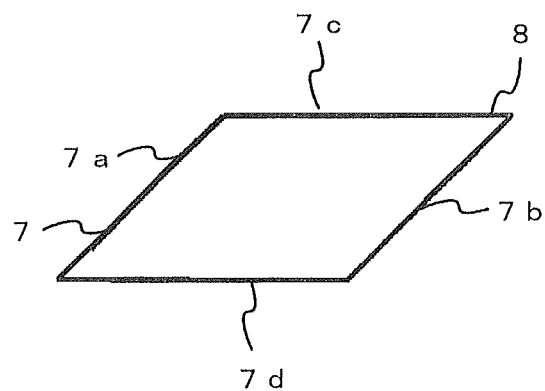
FIG. 10 is a developed view showing a shape of a patch cloth according to Embodiment 3 of the present invention.

FIG. 10 is a developed view showing a shape of a patch cloth according to Embodiment 3 of the present invention.

The patch cloth 3 according to Embodiment 3 is formed in a quadrilateral shape having an angled shaped portion 7. Opposite lateral sides 7a and 7b of the patch cloth 3 are inclined in the same direction. Opposite upper and lower sides 7c and 7d are parallel to each other. As with Embodiment 1, the patch cloth 3 is placed at a position that covers the joint section 6 where the base body portion 9 of the endless handrail 10 is butt-joined. The upper side 7c is placed on the upper surface 4a of the ear portion 4. A parallelogram is preferable as the quadrilateral.

Placing the patch cloth's angled shaped portion 7 on the upper surface and the round shaped interior surface of the ear portion 4 of the endless handrail 10 in conformity to the contour thereof allows for gradually changing the stress produced in the patch cloth 3 at the bonding interface thereof in the joint section 6 of the endless handrail. Accordingly, a peak value of the produced stress is reduced and local stress concentration is suppressed.

Figure 11:
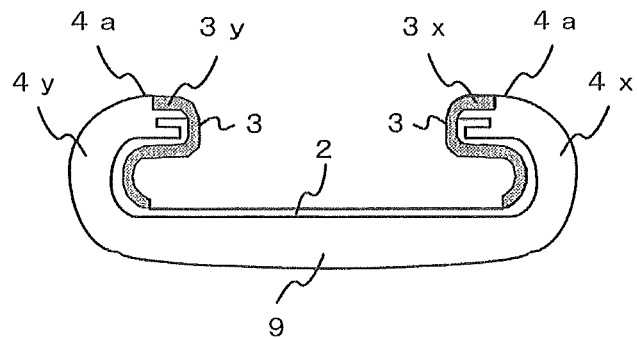
FIG. 11 is a cross sectional view showing a joint section of the endless handrail according to embodiment 3 of the present invention.

FIG. 11 is a cross sectional view showing a joint section of the endless handrail. The ear portion 4 is made up of the preformed thermoplastic resin member 1 and the canvas 2, and formed in accordance with the shape of the endless handrail. The patch cloth 3 is bonded to the canvas 2 in conformity to the contour of the endless handrail from the outside of the ear portion 4 (upper surface 4a) to the interior surface of the ear portion 4. The patch cloth 3 is not placed on the flat base body portion 9 of the endless handrail 10 but is bonded to each of the both-side ear portions 4x and 4y. That is, a patch cloth 3x is bonded to the ear portion 4x side in the joint section 6. Likewise, a patch cloth 3y is bonded to the ear portion 4y side in the joint section 6.

Since stiffness of the both-side ear portions 4 is higher than that of the planar flat portion (base body portion 9) because of the structure of the endless handrail, the patch cloth 3 are bonded to each ear portion 4 of the endless handrail 10. Distribution of the stress produced in the endless handrail by the positive and negative bending occurring when the endless handrail passes through the driving section and through the round section where the handrail is turned from the ascending direction to the descending direction, is such that a higher stress is produced in the both-side ear portions 4 than in the flat portion (base body portion 9). This is the reason why the patch cloth is bonded not up to the flat base body portion of the endless handrail. Bonding the patch cloths 3 separately to the both-side ear portions 4x and 4y can ensure strength of the joint section of the endless handrail.

Embodiment 4

Figure 12:
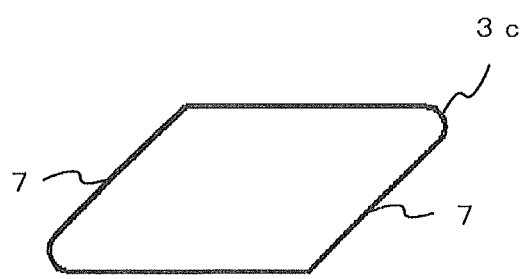
FIG. 12 is a developed view showing a shape of a patch cloth according to Embodiment 4 of the present invention.

FIG. 12 is a developed view showing a shape of a patch cloth according to Embodiment 4 of the present invention. The patch cloth 3 according to Embodiment 4 is also formed to have an angled shaped portion 7. An acute angle corner 8 of the angled shaped portion 7 is formed to have a round shape chamfer 3c. The patch cloth 3 is placed so that the round shape chamfer 3c is positioned on the upper surface of the ear portion 4 (see FIG. 9).

As with Embodiment 1, the patch cloth 3 is placed at a position that covers the joint section 6 where the base body portion 9 of the endless handrail 10 is butt-joined. Placing the patch cloth's angled shaped portion 7 on the upper surface and the round shaped interior surface of the ear portion 4 of the endless handrail in conformity to the contour thereof allows for gradually changing the stress produced in the patch cloth 3 at the bonding interface thereof in the joint section 6 of the endless handrail. Accordingly, a peak value of the produced stress is reduced and local stress concentration is suppressed.

Making the round shaped chamfer on the acute angle corner 8 allows for mitigating local stress concentration produced at the acute angle corner by the positive and negative bending occurring when the endless handrail passes during operation through the driving section and through the round section where the handrail is turned from the ascending direction to the descending direction. In a case of making no round shaped chamfer on the acute angle corner 8, it is conceivable that separation of the patch cloth may begin to occur from the acute angle point because it has a small bonded area. For that reason, by making the round shaped chamfer on the acute angle corner 8, the bonded area of the acute angle corner 8 can be increased, further suppressing separation of the patch cloth. As a result, an effect is brought about that extends the life of the joint section 6 of the endless handrail, as with Embodiment 1.

Thus, making a round shaped chamfer on the acute angle corner 8 can mitigate local stress concentration produced at the acute angle corner and increase the bonded area of the acute angle corner 8, suppressing separation of the patch cloth, as with Embodiment 2. As a result, the effect of extending the life of the joint section 6 of the endless handrail is brought about, as with Embodiment 1.

It should be noted that each embodiment of the present invention may be freely combined, or appropriately modified or omitted within the spirit and scope of the invention.

REFERENCE NUMERALS

1: thermoplastic resin member;
2: canvas;
3: patch cloth;
3a: divergent portion;
3b: base portion;
4: ear portion;
6: joint section;
7: angled shaped portion 7;
8: acute angle corner;
9: base body portion;
10: endless handrail;
50: machine room;
51: steps;
52: main frame;
55: step driving chain;
56: main shaft;
57: drive machine;
58: panels;
100: escalator.

The invention claimed is:

1. An endless escalator-handrail comprising:
a thermoplastic resin member having a first and a second curved portions formed oppositely on both lateral sides of a flat portion of the member, and joined at a joint section by melting cut ends of the member;
a flat woven fabric bonded to an inner surface of the thermoplastic resin member to cover the flat portion and the first and the second curved portions;
a first patch cloth having a base portion and a divergent portion, for being placed on a first curved portion side in the joint section; and
a second patch cloth having a base portion and a divergent portion, for being placed on a second curved portion side in the joint section, wherein
the divergent potion of the first patch cloth is bonded onto the flat woven fabric at an inward side of the first curved portion, and the divergent potion of the second patch cloth is bonded onto the flat woven fabric at an inward side of the second curved portion.

2. The endless escalator-handrail of claim 1, wherein the base portions of the first and the second patch cloths are bonded onto the flat woven fabric at the flat portion of the thermoplastic resin member.

3. The endless escalator-handrail of claim 2, wherein the divergent portions of the first and the second patch cloths each have an acute angle corner, and the acute angle corner being formed in a round shape chamfer.

4. An escalator comprising:
a drive machine installed in a machine room;
steps connected in a loop and ascending/descending by the rotation of the drive machine; and
an endless escalator-handrail of claim 1, turning around in synchronism with the ascending/descending of the steps.

5. An endless escalator-handrail comprising:
a thermoplastic resin member having a first and a second curved portions formed oppositely on both lateral sides of a flat portion of the member, and joined at a joint section by melting cut ends of the member;
a flat woven fabric bonded to an inner surface of the thermoplastic resin member to cover the flat portion and the first and the second curved portions;
a first patch cloth having a quadrilateral shape whose opposite lateral sides are inclined in the same direction, for being placed on a first curved portion side in the joint section; and
a second patch cloth having a quadrilateral shape whose opposite lateral sides are inclined in the same direction, for being placed on a second curved portion side in the joint section, wherein
the first patch cloth is bonded onto the flat woven fabric at an inward side of the first curved portion, and the second patch cloth is bonded onto the flat woven fabric at an inward side of the second curved portion.

6. The endless escalator-handrail of claim 5, wherein the first and the second quadrilateral patch cloths each have an acute angle corner, and the acute angle corner being formed in a round shape chamfer.

7. An escalator comprising:
a drive machine installed in a machine room;
steps connected in a loop and ascending/descending by the rotation of the drive machine; and
an endless escalator-handrail of claim 5, turning around in synchronism with the ascending/descending of the steps.

* * * * *